United States Patent Office

2,966,534
SELECTIVE HYDROGENATION OF ACETYLENES TO OLEFINES

Michael Staines Spencer, Norton-on-Tees, England, assignor to Imperial Chemical Industries Limited, London, England, a corporation of Great Britain No Drawing. Filed Sept. 8, 1959, Ser. No. 838,412

Claims priority, application Great Britain Sept. 24, 1958

6 Claims. (Cl. 260—683)

This invention relates to the selective hydrogenation of acetylene to ethylene.

In the hydrogenation of acetylene, it is well known that it is difficult to terminate the reaction at the production of ethylene, thereby preventing the formation of undesirable quantities of ethane. The process of the present invention overcomes this difficulty.

Thus, according to the present invention, there is provided a process for the hydrogenation of acetylene to ethylene without the formation of undesirable quantities of ethane, which comprises the step of contacting a solution containing $[Ni(CN)_4]^{2-}$ ions with nascent hydrogen to give a solution containing $[Ni_2(CN)_6]^{4-}$ ions, hydrogen ions and cyanide ions, and bringing acetylene into contact with this solution.

The first stage of the reaction may probably be regarded as the reduction of the $[Ni(CN)_4]^{2-}$ ions to the $[Ni_2(CN)_6]^{4-}$ ions according to the equation:

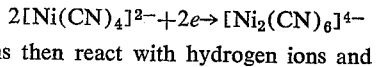
$$2[Ni(CN)_4]^{2-} + 2e \rightarrow [Ni_2(CN)_6]^{4-}$$

These ions then react with hydrogen ions and acetylene according to the equation:

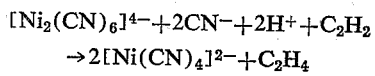
$$[Ni_2(CN)_6]^{4-} + 2CN^- + 2H^+ + C_2H_2 \rightarrow 2[Ni(CN)_4]^{2-} + C_2H_4$$

It will be understood that the present invention is not dependent upon the correctness of the theory of the reaction outlined above.

The process of the present invention is suitably carried out at a temperature in the range of 0° to 60° C., preferably 15° to 30° C. In particular, it is convenient to operate at substantially atmospheric temperature.

It is preferable to carry out the process of the present invention using a CN:Ni molar ratio of at least 4:1. Otherwise there is a tendency for the acetylene to undergo polymerisation.

The nascent hydrogen employed may be produced in any convenient manner. For example, it may be obtained by the reaction of sodium amalgam with water or it may be produced electrolytically.

The reaction is conveniently carried out by continuously passing the salt solution containing $[Ni(CN)_4]^{2-}$ ions down a reactor up which the acetylene-containing gas is flowing and submitting the liquid leaving the bottom of this reactor to treatment with nascent hydrogen before re-introducing it at the top.

Example 1

A solution of 5 gms. of potassium cyanide and 5.6 gms. of nickel sulphate, $Ni(SO_4)_2.7H_2O$ in one litre of water was circulated at 10 litres per hour through a reactor tube 80 cm. in length and 3 cm. in diameter packed with Raschig rings. The solution leaving the bottom of this reactor was continuously treated with nascent hydrogen liberated by the action of a sodium amalgam. An acetylene-containing gas was passed continuously up the reactor at the rate of 2 litres per hour. The inlet and outlet compositions of this gas were as follows:

|          | Inlet | Outlet |
|----------|-------|--------|
| Hydrogen | 0     | 3.5    |
| Acetylene| 7.6   | 0.2    |
| Ethylene | 91.2  | 93.5   |
| Ethane   | 0.1   | 1.2    |

Example 2

Example 1 was repeated except that the gas flowed up the reactor at a rate of 2.5 litres per hour and had a composition different from that employed in Example 1. The following results were obtained:

|          | Inlet | Outlet |
|----------|-------|--------|
| Hydrogen | 0     | 2.7    |
| Acetylene| 17.3  | 0.7    |
| Ethylene | 81.6  | 95.5   |
| Ethane   | 0.1   | 0.6    |

A blank run was carried out in the presence of sodium amalgam but in the absence of potassium cyanide and nickel sulphate. The absence of hydrogenation of the acetylene in the feed indicated that the hydrogen liberated by the sodium amalgam was not sufficient in itself to bring about the hydrogenation.

Example 3

Example 1 was repeated except that the gas flowed up the reactor at a rate of 1.5 litres per hour and had a composition different from that employed in Example 1. The inlet and outlet compositions of the gas were as follows:

|          | Inlet | Outlet |
|----------|-------|--------|
| Hydrogen | 0     | 5.1    |
| Acetylene| 33.0  | 0.2    |
| Ethylene | 66.9  | 87.2   |
| Ethane   | 0.1   | 1.0    |

The residual quantity of the outlet gas was nitrogen.

Example 4

Example 1 was repeated except that the catalyst solution contained 25 grams of potassium cyanide and 28 grams of nickel sulphate, $Ni(SO_4)_2.7H_2O$, in one litre of water. The gas flowed up the reactor at a rate of 11 litres per hour. The inlet and outlet compositions of the gas are given below:

|          | Inlet | Outlet |
|----------|-------|--------|
| Hydrogen | 0     | 0.5    |
| Acetylene| 9.0   | 2.7    |
| Ethylene | 89.8  | 95.9   |
| Ethane   | 0.1   | 0.6    |

I claim:

1. A process for the hydrogenation of acetylene to ethylene without the formation of undesirable quantities of ethane, which comprises the step of contacting a solution containing $[Ni(CN)_4]^{2-}$ ions with nascent hydrogen to give a solution containing $[Ni_2(CN)_6]^{4-}$ ions, hydrogen ions and cyanide ions, and bringing acetylene into contact with this solution.

2. A process as claimed in claim 1 in which the reaction is carried out at a temperature in the range of 0° to 60° C.

3. A process for the hydrogenation of acetylene to ethylene without the formation of undesirable quantities of ethane, which comprises the step of contacting a solution containing $[Ni(CN)_4]^{2-}$ ions, the CN:Ni molar ratio being at least 4:1, with nascent hydrogen to give a solution containing $[Ni_2(CN)_6]^{4-}$ ions, hydrogen ions and cyanide ions, and bringing acetylene into contact with this solution.

4. A process for the hydrogenation of acetylene to ethylene without the formation of undesirable quantities of ethane, which comprises the step of contacting a solution containing $[Ni(CN)_4]^{2-}$ ions with nascent hydrogen produced by the reaction of sodium amalgam with water to give a solution containing $[Ni_2(CN)_6]^{4-}$ ions, hydrogen ions and cyanide ions, and bringing acetylene into contact with this solution.

5. A process for the hydrogenation of acetylene to ethylene without the formation of undesirable quantities of ethane, which comprises the step of contacting a solution containing $[Ni(CN)_4]^{2-}$ ions with nascent electrolytic hydrogen to give a solution containing $[Ni_2(CN)_6]^{4-}$ ions, hydrogen ions and cyanide ions, and bringing acetylene into contact with this solution.

6. A process as claimed in claim 1 in which the reaction is carried out by passing a solution containing $[Ni_2(CN)_6]^{4-}$ ions down a reactor up which an acetylene-containing gas is flowing and submitting the liquid leaving the bottom of the reactor to treatment with nascent hydrogen before reintroducing it at the top.

References Cited in the file of this patent
UNITED STATES PATENTS 1,179,051     Traube _____ Apr. 11, 1916